Nov. 3, 1964    R. REESE    3,155,265
THERMAL STRESS EQUALIZING SUPPORT SYSTEM
Filed Jan. 5, 1961    3 Sheets-Sheet 1
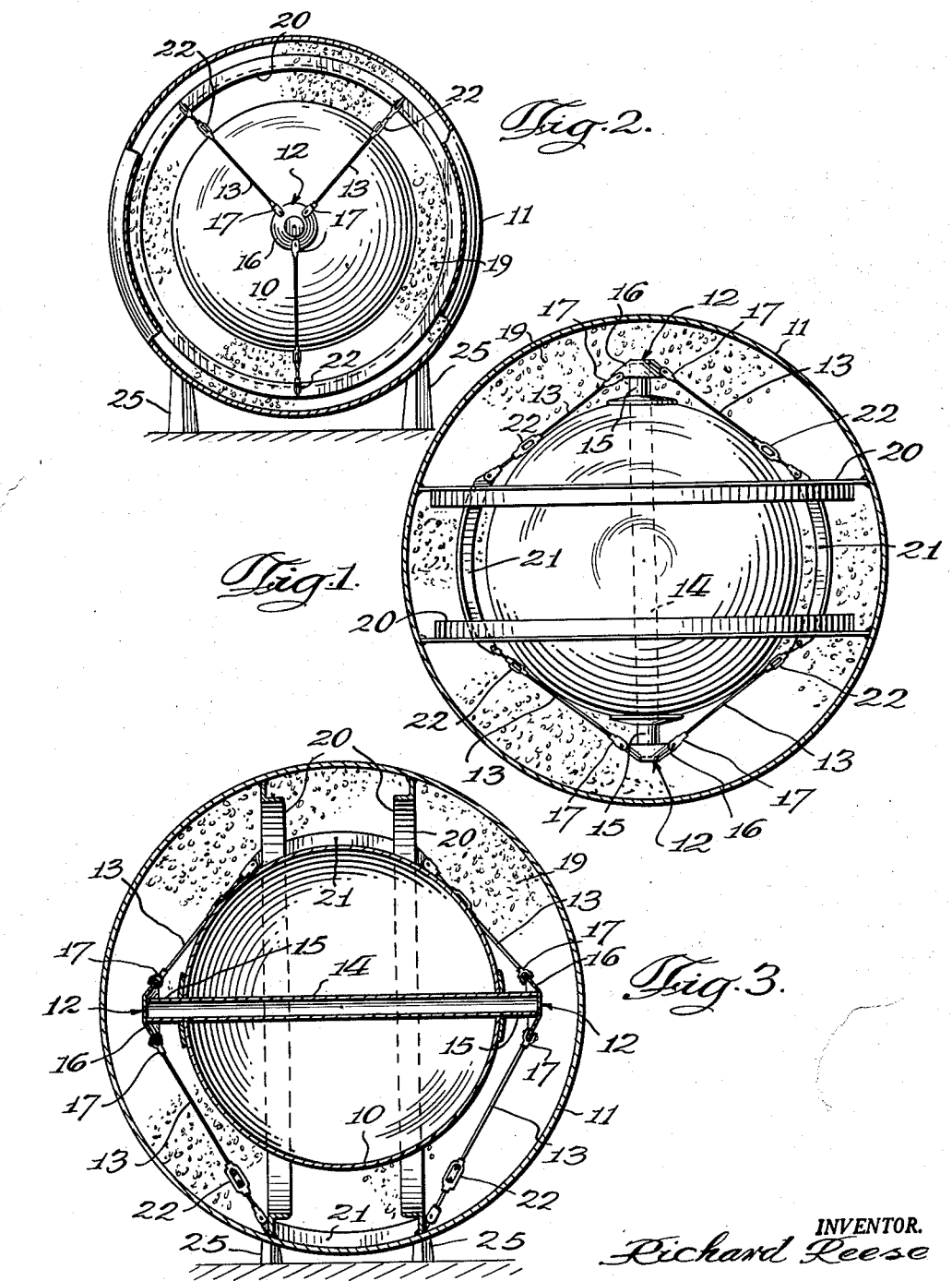
INVENTOR.
Richard Reese
BY
Merriam, Smith & Marshall
Attorneys

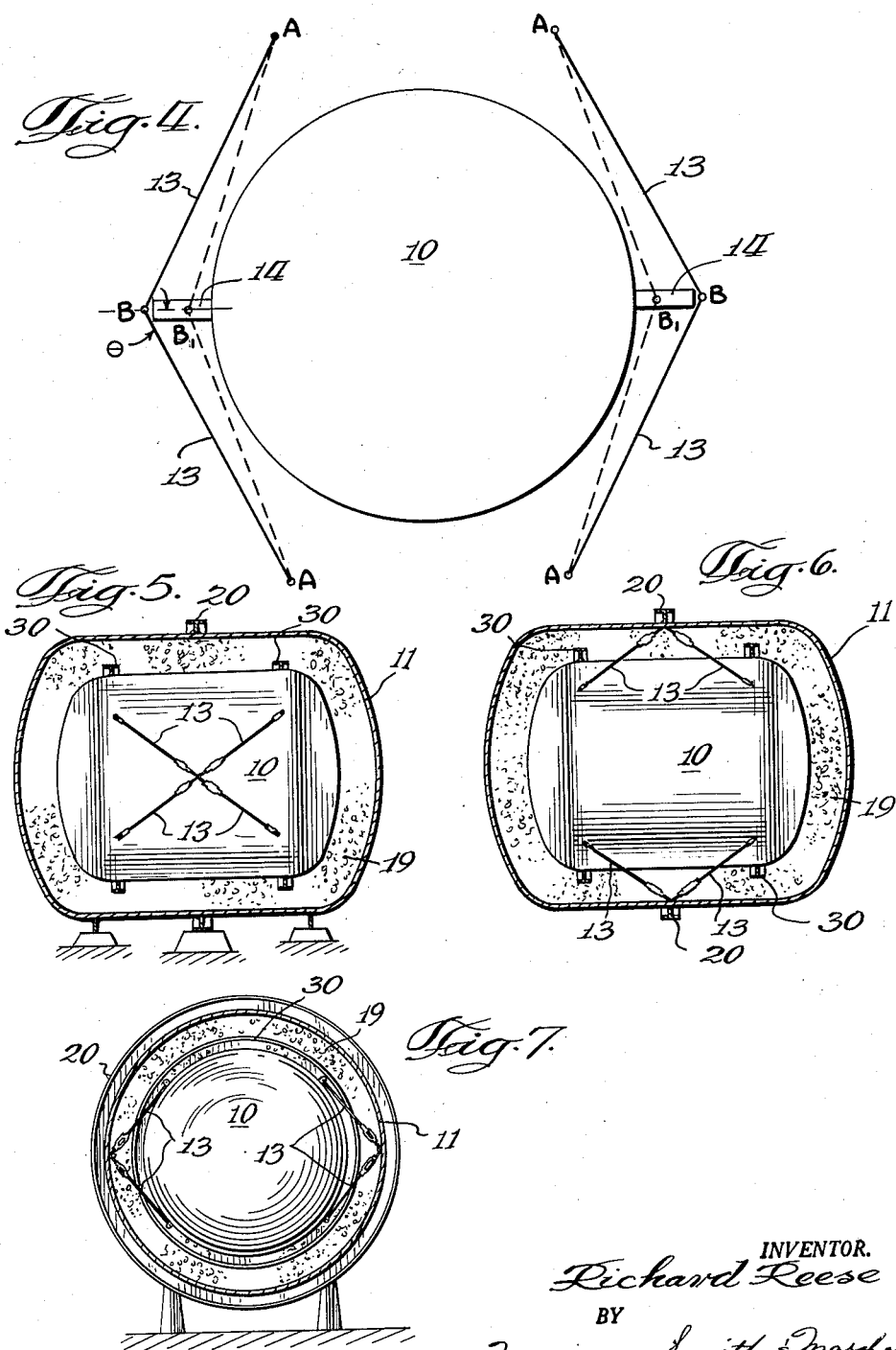

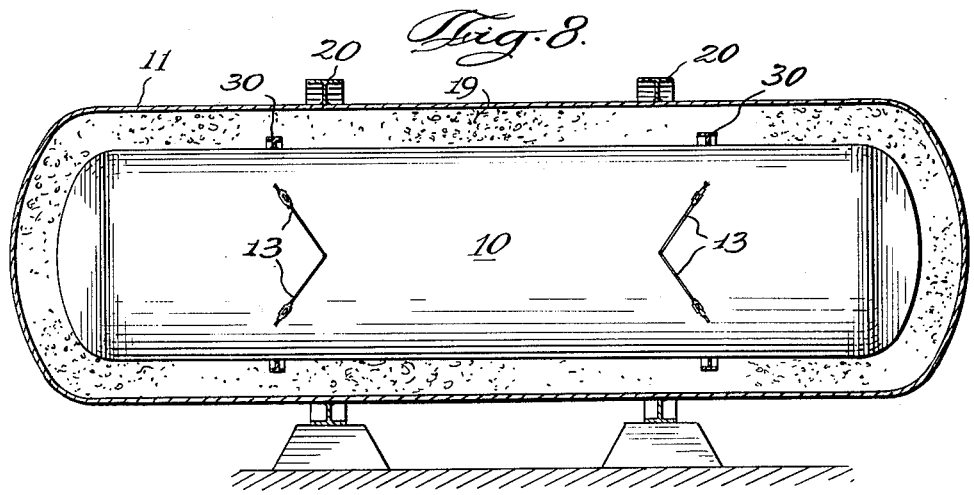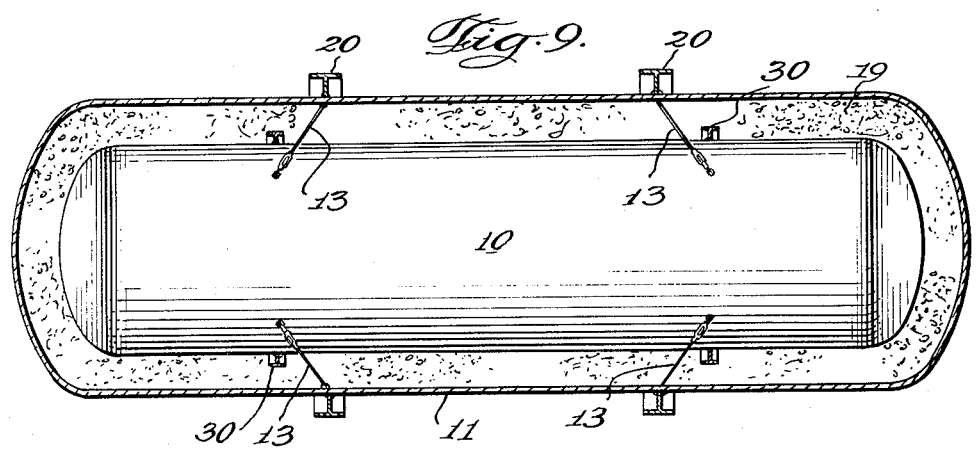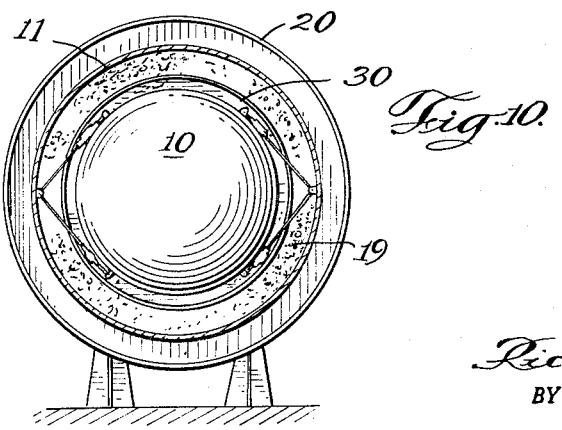

United States Patent Office 3,155,265
Patented Nov. 3, 1964

3,155,265
THERMAL STRESS EQUALIZING SUPPORT
SYSTEM
Richard Reese, Park Forest, Ill., assignor to Chicago
Bridge & Iron Company, Chicago, Ill.
Filed Jan. 5, 1961, Ser. No. 80,788
6 Claims. (Cl. 220—15)

This invention relates to the low temperature storage of liquefied normally gaseous products. It is more specifically concerned with a support system for the inner storage vessel of a multi-walled tank used for the storage of cryogenic liquids.

In the low temperature storage of liquefied normally gaseous products such as cryogenic liquids at about their normal ebullition temperature specially designed storage tanks which are sometimes subjected to shock loads are used. The low storage temperatures, for example, the normal ebullition temperature of oxygen is −297° F., requires that well insulated vessels be used. Generally, the storage vessels are either spheres or horizontal cylindrical tanks, and consist of an inner storage vessel surrounded by a mass of insulating material and an outer shell spaced from the inner vessel to provide an annular space which contains the insulation and a support system for the inner vessel. The weight of the stored product and the inner sphere is supported by an adequate support system which transmits the load to the outer shell that is provided with the proper means of supporting the total vessel.

The usual loading to which the storage vessel is subjected is the weight of the storage vessel and its contents. Special loadings to which the tank may be subjected are those which occur during transportation of the vessel to the final site, and massive vibrations which may occur at the time of use of facilities to which the vessel is appurtenant. Some services require that a design live shock load of three times gravity in all directions be imposed on the vessel. These loads are in addition to the loads created by weight, pressure, etc.

In addition to the loads described above, a thermal loading can be introduced to the support system. As the cryogenic liquid enters and cools the inner storage vessel, the vessel contracts. The outer shell remains essentially the same size since it is efficiently insulated from the inner vessel. If the support system for the inner vessel must resist the three dimensional loads described above, without proper arrangement the supporting members would be stressed as the support system and the inner vessel cool.

In accordance with the instant invention, a support system is provided for supporting the inner vessel from the outer shell and for resisting the dimensional loads, said support system being so oriented that loadings which might otherwise result from thermal length changes in the vessel and support members will be insignificant.

In the drawings:

FIGURE 1 is a plan view, showing the outer shell in cross-section through its equator, of an embodiment of a storage tank of this invention;

FIGURE 2 is an elevation view taken along line 2—2 of FIGURE 1 with the outer shell being shown in cut-away;

FIGURE 3 is a cross-sectional elevation view taken through line 3—3 of FIGURE 1;

FIGURE 4 is a schematic view illustrating the dimensional changes occurring in the inner storage vessel during the thermal-induced expansion and contraction;

FIGURE 5 is an elevation view, with the outer shell being cut away at its equator, of another embodiment of this invention;

FIGURE 6 is a plan view of the storage tank illustrated in FIGURE 5 showing the outer shell cut along its equator;

FIGURE 7 is a side elevation view of the storage tank illustrated in FIGURE 5 with the outer shell being shown in cut-away; and, FIGURES 8–10 are views similar to those shown in FIGURES 5–7, respectively, illustrating still another embodiment of the subject invention.

Referring to the attached drawings, FIGURE 1 shows a vessel consisting of a spherical inner storage vessel 10 coaxial or axially aligned with outer shell 11, and support system 12. The inner vessel 10 is the container for the cryogenic liquid and is suspended from the outer shell 11 by means of support system 12 which, in the illustrative embodiment, comprises support members 13 such as cables, chains, wire rope, etc., and a tubular element 14 which in the illustrative embodiment extends diametrically through the inner sphere 10 and protrudes from the inner storage vessel 10 at opposite poles to provide stub hangers 15. It is not necessary that the stub hangers 15 be provided by means of a tubular element 14 which extends completely through the sphere 10. For example, attaching means, such as stub bosses attached to the wall of vessel 10 and protruding therefrom a proper distance, which will be explained later, can be used. Suitable reinforcing of the vessel wall is used to insure proper mounting of the stub hangers 15 without tearing the inner vessel wall. To the distal ends of the stub hangers 15 are attached one end of the support members 13 by means of a formed connector flange 16 which is secured to the terminal end of the hangers 15. The metal rods which are used as support members 13 re coupled to the connector flange 16 by pivoting means such as a clevis 17.

The other end of the support members 13 are secured to a shell stiffener system which comprises a pair of spaced stiffener rings 20 attached to the inner wall of the outer shell 11 and substantially coaxially aligned with stub hangers 15. At the points of attachment of the support members 13 to the stiffener rings, laterial stiffener members 21 are placed between the stiffener rings, and secured thereto as well as to the outer vessel shell by welding, riveting, or the like. Turnbuckles 22 employing a clevis are used to connect the other end of the support members 13 to the outer shell.

Components of the support members 13 loads at the outer shell 11 in the plane of the stiffener rings are resisted by the stiffener rings 20; loads normal to the stiffener rings 20 are resisted by stiffener members 21 placed normal to the rings 20 at the support member 13 tie locations. Turnbuckles 22 as above noted, provide the adjustment for the support members 13 for final positioning of the inner vessel 10. It is necessary that the support member attachments be made at a common point external to the inner sphere 10. The length of the stub hangers 15 is governed by the geometry of the support vessels that will produce a minimum of stress due to thermal length changes.

The vessel is insulated in the conventional manner. The annular space between the spheres can be filled with a suitable insulating material 19 such as expanded perlite or other type of loose fill, granular or fibrous insulation, or batts or blocks of insulation, such as foamed plastics or fiberglass masses. If desired, the annular space can be evacuated to a moderate vacuum. Support for the entire vessel is provided by suitable pedestal supports 25 located in alignment with the stiffener ring 20 attached to the outer shell 11.

Restraint is offered by the support system for any combination of X, Y or Z loads. Although a degree of rotational freedom remains, since the inner vessel 10 can rotate about the longitudinal axis of the stub hangers 14, by proper arrangement of the piping connections, which for purposes of clarity are not shown in these drawings, this rotation will be prevented.

In FIGURE 4 support system movement is schematically illustrated which shows the support members 13 attached to the stiffener rings 20 at points A, and to the hanger bosses 14 at points B. As the cryogenic liquid fills the inner sphere 10, the flexible connectors 13 thermally contract to a length $AB_1$. At the same time, the pipe cools and the length of the support pipe, B—B, contracts to length $B_1$—$B_1$. By adjusting the length and angle of the connectors 13, the angular motion and shortening of the cable coincides with the shortening of the support pipe and the thermal contraction stresses are substantially eliminated. In support systems where the hanger bosses 14 protrude from the inner vessel such as shown in FIGURE 1 it is preferred that the hanger bosses 14 extend outwardly as far as possible without excessively cooling the outer shell to improve the efficiency of the support system. Other support systems, however, can be used as will hereinafter be discussed.

The principles of the instant invention are illustrated by a storage tank designed for the storage of liquid oxygen at missile launching sites. In a 600-gallon liquid oxygen installation a spherical assembly illustrated in FIGURE 1 comprises an outer shell 8'-2" I.D., fabricated from 3/16" mild carbon steel and a 5'-6½" inner shell fabricated from 3/16" aluminum. A 3½" pipe is diametrically mounted in the inner vessel to provide support bosses which extend about 7½" beyond the wall of the vessel. The annular space is evacuated and filled with granular perlite. A pair 4" x 4" x 5/16" structural steel angles formed into a ring are used as stiffener rings having a 7'-8" O.D. The rings are spaced 2'-10" apart and secured to the outer vessel wall by welding. A set of three stainless steel support cables angularly displaced each from the other are used as connectors between each of the stiffener rings and the cooperating support boss. The upper cables, which are 7/16" diameter, are spaced 90° apart and the lower cables which are 1/4" diameter, are mounted in a vertical plane. Each of the cables are of equal length and at no-load ambient atmospheric temperature conditions are connected between the support boss and stiffener rings at a slope having a 7 to 12 pitch. The upper cables are pre-tensioned whereas the lower ones are not.

Applications of the stress compensating principle of this invention can also be applied to cylindrical containers. FIGURES 5, 6, and 7 show a method for supporting short cylindrical vessels in accordance with this invention.

It will be noted that the inner vessel is provided with a pair of spaced stiffener rings 30 fabricated from T-shaped structural shapes for the purpose of providing rigidity in the inner vessel 10.

FIGURES 8–10 illustrate a method of support for long cylindrical vessels. The same principles of design and construction is used here as above described and illustrated. Any number of supports may be used, depending on the weight of the stored product and dimensions of the tank.

In all support systems embodying the instant invention the geometry of the support system members 13 is selected such that substantially no slack and no thermal stress is induced in the connection throughout its angular displacement from its position under ambient non-storage conditions to the position assumed when the inner vessel has contracted to its equilibrium size under low temperature storage conditions. In other words, the support mounting means of applicant accommodates the dimensional changes incurred due to thermal changes in such a manner that substantially no thermal stress arises in applicant's storage facility. With this optimum design the storage vessel can be used for storing a variety of cryogenic liquids because no thermal stress in the connector will be produced in any intermediate position between zero contraction and maximum contraction of the storage vessel. In this instance the geometry is designed for use with the cryogenic liquid having the lowest normal ebullient temperature.

In the support system of this invention an optimum angle $\theta$ is determined for suspending the inner storage vessel which will neither introduce stress into the support rods nor allow them to go slack. There are a number of factors which will influence the size of this angle including material of construction for the inner vessel, support member material of construction and condition of insulation space, i.e., whether perlite filled, or perlite filled and evacuated. To illustrate the determination of the angle $\theta$ for a support system employed in a storage tank illustrated in FIGURES 1–3. In the following calculations it is assumed that the support rods are stainless steel and the insulation space is perlite filled and evacuated to a vacuum. Three illustrative examples include: inner containers fabricated respectively from aluminum, stainless steel, and 9% nickel steel.

*Case I.—Aluminum Inner Vessel*

(1) Length, $l$, of tubular support element=82"
(2) Change in length, $\delta$, due to cooling
$$\delta = \alpha \Delta T l \quad \alpha = 18.32 \times 10^{-6} \text{ inches/inch/}^\circ C.$$
$$\delta = 18.32 \times 10^{-6}(200)(82) \quad \Delta T = 200^\circ C.$$
$$\delta = 0.3001'' \quad l = 82''$$
$\delta$ One end=0.3001/2=0.1502"

(3) Length, $l_{sm}$, of support connectors=51"

$$\delta_{sm} = \frac{\alpha \Delta T l}{2} \quad \alpha = 13.1 \times 10^{-6} \text{ inches/inch/}^\circ C.$$

$$\delta_{sm} = \frac{13.1 \times 10^{-6}(200)(51)}{2} \quad \Delta T = 200^\circ C.$$

$$\delta_{sm} = .0668'' \quad l_{sm} = 51''$$

(4) Angle of attachment.

$$\cos \theta = \frac{.0668}{.1502}$$

$$\theta = 63.6^\circ$$

*Case II.—Stainless Steel Inner Vessel*

Same dimensions and equations as in Case I:
(1) Change in length, $\delta$, of tubular support element:
$$\delta = 13.1 \times 10^{-6}(200)(82)$$
$$\delta = 0.2146''$$
$\delta$ One end=0.2146/2=0.1073"

(2) Change in length, $\delta_{sm}$, of support connectors (same as Case I)

$$\delta_{sm} = .0668''$$

(3) Angle of attachment.

$$\cos \theta = \frac{.0668}{.1073}$$

$$\theta = 41.3^\circ$$

Case III.—9% Nickel Steel Inner Vessel

Same dimensions and equations as in Case I.

(1) Change in length, $\delta$, of tubular support element $$\delta = 9.7 \times 10^{-6}(200)(82)$$

$$= 0.159''$$

$$\delta(\text{One end}) = \frac{0.159}{2} = 0.0795$$

(2) Change in length, $\delta_{sm}$, of support connectors $$\delta_{sm} = 0.0068$$

(3) Angle of attachment.

$$\cos \theta = \frac{0.0668}{0.0795} = 0.84$$

$$\theta = 32.5°$$

Therefore it is seen that the angle of attachment $\theta$ is equal to $$\cos \theta = \frac{\text{change in length of the support member due to a temperature differential } \Delta T}{\text{change in length of the attaching means due to a temperature differential } \Delta T}$$

where $\Delta T$ equals the change in temperature between a stored and non-storage condition Several variations of the illustrative embodiment shown can be made. Any number of support members may be used so long as the arrangement will thermally equalize length changes. Bars, rods, plates, etc., may be substituted for the cables. Any shape of container may be used, provided that the support members are properly oriented. The support pipe through the container is not required for thermal equalization. For instance, a trunnion support placed at each of two opposite poles will have identical thermal contraction to the pipe through the container. Neither is it necessary that the insulation space be under vacuum. In fact, less thermal length change will occur in the support members with the insulation space at atmospheric pressure. This system of support may be extended to the storage of any cold liquid and need not be limited to cryogenic liquids.

The instant invention has particular application in the storage of liquefied gaseous materials such as oxygen, air, nitrogen, methane, etc., in vessels having capacities of 100 to 20,000 gallons; however, other tank sizes can be used. The inner vesssel can be constructed of materials which do not become brittle in the low temperature service to which they are exposed. Metals such as aluminum, cupro-nickel, and others have desirable properties over substantially the entire temperature range. Steel alloys, however, have to be "notch tough" (Charpy Impact Test of about not less than 15 footpounds keyhole at the lowest expected operating temperature of the material), e.g. 18–8 stainless steel, 9% nickel alloy steel, and others. The outer vessel, however, can be constructed from conventional materials of construction, preferably low carbon steel.

The foregoing description is given for clearness and understanding only, and no undue limitations should be placed thereon. To facilitate the description of the invention suitable piping and valving arrangements for filling, emptying, venting, etc. are not shown because various schemes which are obvious to those skilled in the art can be used. Modifications and changes, in the illustrated embodiments of the support system of this invention can be made without departing from the spirit and scope of this invention and will be obvious to those skilled in the art.

What is claimed is:

1. A facility for storing a cryogenic liquid at low temperature, said facility comprising:
    an outer vapor barrier shell;
    an inner storage vessel spaced and thermally insulated from said shell, said vessel being subject to thermally induced dimension changes;
    attaching means joined to said inner vessel for attaching said inner vessel to a support system;
    a support system for supporting said vessel in spaced relation from said outer shell, said support system comprising:
    a plurality of pivotal mounting means connecting said inner vessel and shell for supporting said inner vessel within said shell without imparting any substantial thermal stress to said system notwithstanding said thermally induced dimension changes by said vessel, said mounting means comprising:
    a plurality of support members;
    first means for pivotally mounting one end of said members to said shell; and,
    second means for pivotally mounting the remaining ends of said members to said attaching means on said vessel, said members being angularly disposed between said vessel and shell to compensate for the thermally induced dimension changes between said shell and said vessel, the length of said support members and the angle of attachment thereof to said inner vessel being such that said support members are substantially free from thermal stresses during service use of said tank, said angle of attachment $\theta$, when said vessel is in a non-storage condition, being defined by $$\cos \theta = \frac{\text{change in length of the support member due to a temperature differential } \Delta T}{\text{change in length of the attaching means due to a temperature differential } \Delta T}$$

where $\Delta T$ is equal to the change in temperature between a storage and a non-storage condition for said vessel.

2. A facility in accordance with claim 1 wherein: said inner storage vessel is spherical.

3. A facility in accordance with claim 1 wherein: said inner storage vessel is cylindrical.

4. A facility in accordance with claim 3 wherein: said outer shell is cylindrical.

5. A facility for storing a cryogenic liquid at low temperature, said facility comprising:
    an outer vapor barrier shell;
    an inner storage vessel spaced and thermally insulated from said shell, said vessel being subject to thermally induced dimension changes;
    a plurality of support bosses mounted on said inner vessel;
    a support system for supporting said vessel in spaced relation from said outer shell, said support system consisting essentially of:
    a plurality of pivotal mounting means connecting said inner vessel and shell and supporting said inner vessel within said shell without imparting thermal stress to said system notwithstanding said thermally induced dimension changes by said vessel, said mounting means comprising:
    a plurality of elongated support members;
    first means for pivotally mounting one end of said members to said shell; and,
    second means for pivotally mounting the remaining ends of said members to said support bosses on said vessel, said members being angularly disposed between said vessel and shell to compensate for the thermally induced dimension changes between said shell and said vessel, the length of said support members and the angle of attachment thereof to said inner vessel being such that said support members are substantially free from thermal stresses during service use of said tank, said angle of attachment $\theta$, when said vessel is in a non-storage condition, being defined by Cos $\theta =$
$$\frac{\text{change in length of the elongated support member due to a temperature differential } \Delta T}{\text{change in length of the support boss due to a temperature differential } \Delta T}$$

where $\Delta T$ is equal to the change in temperature between a storage and a non-storage condition for said vessel.

6. A facility in accordance with claim 5 wherein: said inner storage vessel is spherical; and, a pair of vessel support bosses are provided by a support element extending diametrically through said vessel and laterally outwardly therefrom on a pair of opposite sides References Cited in the file of this patent

UNITED STATES PATENTS

| | | |
|---|---|---|
| 2,592,974 | Sulfrian | Apr. 15, 1952 |
| 2,926,810 | Yeager | Mar. 1, 1960 |
| 2,952,380 | Hampton et al. | Sept. 13, 1960 |
| 3,011,674 | Jackson | Dec. 5, 1961 |
| 3,021,027 | Claxton | Feb. 13, 1962 |

UNITED STATES PATENT OFFICE
CERTIFICATE OF CORRECTION

Patent No. 3,155,265                                           November 3, 1964

Richard Reese

It is hereby certified that error appears in the above numbered patent requiring correction and that the said Letters Patent should read as corrected below.

Column 2, line 41, for "re" read -- are --; line 48, for "laterial" read -- lateral --; column 5, line 6, for "=0.159"" read -- $\delta=0.159''$ --; line 11, for "0.0068" read -- 0.0668 --.

Signed and sealed this 6th day of April 1965.

(SEAL)
Attest:

ERNEST W. SWIDER                                        EDWARD J. BRENNER
Attesting Officer                                              Commissioner of Patents